United States Patent [19]

Wnuk

[11] Patent Number: 4,944,181

[45] Date of Patent: Jul. 31, 1990

[54] CAPACITIVE STRAIN GAGE HAVING FIXED CAPACITOR PLATES

[75] Inventor: Vincent P. Wnuk, Lunenburg, Mass.

[73] Assignee: Hitec Products, Inc., Ayer, Mass.

[21] Appl. No.: 238,307

[22] Filed: Aug. 30, 1988

[51] Int. Cl.$^5$ .............................................. G01B 7/22
[52] U.S. Cl. ...................................... 73/780; 361/294
[58] Field of Search ........................... 73/780, 862.64; 361/294

[56] References Cited

U.S. PATENT DOCUMENTS

| | | | |
|---|---|---|---|
| 3,140,601 | 7/1964 | Weyland et al. | 73/780 |
| 3,566,222 | 2/1971 | Wolfendale | 361/294 |
| 3,729,985 | 5/1973 | Sikorra | 73/780 |
| 3,852,672 | 12/1974 | Nelson | 328/1 |
| 3,995,696 | 12/1976 | Kainer et al. | 73/780 |
| 4,030,347 | 6/1977 | Norris et al. | 73/88.5 R |
| 4,054,049 | 10/1977 | Egger | 73/16 |
| 4,098,000 | 7/1978 | Egger | 33/148 D |
| 4,196,632 | 4/1980 | Sikorra | 73/718 |
| 4,197,753 | 4/1980 | Harting et al. | 73/766 |
| 4,237,989 | 12/1980 | Lewis | 73/862.64 |
| 4,445,386 | 5/1984 | Nielsen | 73/780 |

OTHER PUBLICATIONS

J. M. Nielsen, "A Hermetically Sealed High Temperature Capacitive Strain Gage Design", date unknown.

Primary Examiner—Jerry W. Myracle
Attorney, Agent, or Firm—Wolf, Greenfield & Sacks

[57] ABSTRACT

A capacitive strain gage includes a housing attachable to a test specimen at a first location and a ground plane attachable to the test specimen at a second location. The housing and the ground plane are movable relative to each other. A passage extends through the housing between opposing spaced-apart surfaces. First and second excitation electrodes are located on one of the surface, and a third signal electrode is located on the other of the surfaces. The electrodes each have fixed positions on the housing. Each of the first and second electrodes is positioned for capacitive coupling to the third electrode. The ground plane includes an arm that extends into the passage in the housing. The arm includes an aperture for electric fields that is aligned with the electrodes in a quiescent position. The aperture is sized and shaped such that when strain in the test specimen causes relative movement of the housing and the arm, the capacitive coupling between the third electrode and at least one of the first and second electrodes is changed. The capacitive strain gage can have a planar or an annular configuration.

9 Claims, 5 Drawing Sheets

CAPACITIVE STRAIN GAGE HAVING FIXED CAPACITOR PLATES

FIELD OF THE INVENTION

This invention relates to a transducer for measurement of strain in a test specimen or a test material and, more particularly, to a capacitive strain gage including capacitor plates that have fixed positions relative to each other.

BACKGROUND OF THE INVENTION

Strain gages for measuring strain in a test specimen or test material when the specimen is subjected to a mechanical force are well-known in the art. Strain produces relative displacement of spaced-apart points on the test specimen and can be measured. Resistive strain gages are commonly used, but are limited to measurement of relatively small strain ranges and are subject to creep and drift as they age.

Capacitive strain gages have also been utilized in the prior art. Typically, capacitive strain gages utilize capacitors with plates which are movable relative to each other as a function of applied strain. The plates of the capacitor are affixed by appropriate mounting means to different points on a test specimen. As force is applied to the test specimen, relative movement of the capacitor plates causes the capacitance to change. The change in capacitance is sensed by detecting the change in an applied a.c. signal. Capacitive strain gages have been utilized because of their capability to measure large strain ranges, stable operation over a wide range of temperatures and the lack of creep and drift with age. A prior art capacitive strain gage is disclosed in U.S. Pat. No. 4,197,753 issued Apr. 15, 1980 to Harting et al.

Various problems have been associated with capacitive strain gages having movable capacitor plates. A strain gage is intended to measure strain in a single direction. However, movable capacitor plates often move in directions other than the selected measurement direction due to mechanical imperfections, vibration and the like. Movement in directions other than the selected measurement direction causes a change in capacitance which results in an erroneous strain measurement. A further disadvantage of capacitive strain gages having movable capacitor plates is the necessity for connecting flexible lead wires to the movable plates. When the gage is subjected to vibration or to other mechanical stress, the flexible leads tend to break, causing a failure of the gage.

It is a general object of the present invention to provide improved capacitive strain gages.

It is a another object of the present invention to provide capacitive strain gages having capacitor plates with fixed relative positions.

It is a further object of the present invention to provide capacitive strain gages that are highly accurate over a wide range of operating conditions.

It is yet another object of the present invention to provide capacitive strain gages that are simple in construction and extremely rugged when subjected to adverse environmental conditions.

SUMMARY OF THE INVENTION

According to the present invention, these and other objects and advantages are achieved in a capacitive strain gage for measuring strain in a test specimen. The capacitive strain gage comprises a housing attachable to the test specimen at a first location and a ground plane attachable to the test specimen at a second location. The housing and the ground plane are movable relative to each other. A passage extends through the housing between opposing, spaced-apart surfaces. First and second excitation electrodes are disposed on one of the opposing surfaces, and a third signal electrode is disposed on the other of the opposing surfaces. The electrodes each have fixed positions on the housing. Each of the first and second electrodes is positioned for capacitive coupling to the third electrode. The ground plane includes an arm that extends into the passage in the housing. The arm includes an aperture for electric fields that is aligned with the electrodes in a quiescent position. The aperture is sized and shaped such that when strain in the test specimen causes relative movement of the housing and the arm, the capacitive coupling between the third electrode and at least one of the first and second electrodes is changed.

The first and second electrodes preferably comprise parallel conductive strips perpendicular to the direction of relative movement of the housing and the ground plane. Preferably, the first and second electrodes have parallel outer edges perpendicular to the direction of relative movement, and the aperture in the ground plane includes parallel opposite edges that are respectively aligned with, and parallel to, the outer edges of the first and second electrodes. The third electrode preferably includes parallel opposite edges that are respectively aligned with, and parallel to, the outer edges of the first and second electrodes.

In a preferred, generally planar embodiment, the first and second electrodes are in a first plane, and the third electrode is in a second plane parallel to the first plane. In an alternate embodiment, the capacitive strain gage has a cylindrical configuration, and the housing includes surfaces for mounting of annular first, second and third electrodes. The housing includes a passage between the electrodes for receiving an annular ground plane having an aperture.

The capacitive strain gage of the present invention is extremely stable and accurate under adverse environmental conditions. Since the capacitor plates are fixed relative to each other, flexible connection leads are not required. The gage can be scaled for measuring different ranges of strain and is extremely rugged.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
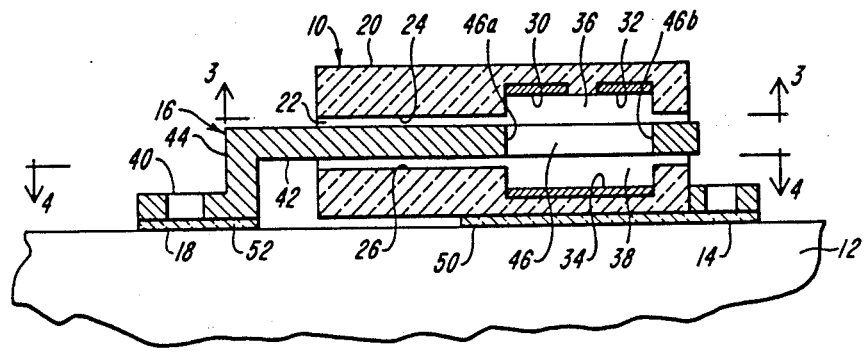
FIG. 1 is a cross-section of a capacitive strain gage in accordance with the present invention.
Figure 2:
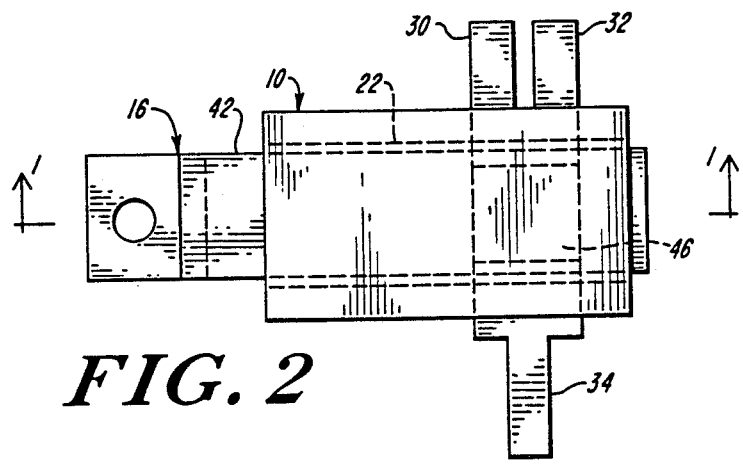
FIG. 2 is a plan view of the capacitive strain gage.

A capacitive strain gage in accordance with the present invention is illustrated in FIGS. 1–4. The strain gage includes a housing 10, attachable to a test specimen 12 at a first attachment point 14, and a ground plane 16, attachable to test specimen 12 at a second attachment point 18. The first and second attachment points 14, 18 are spaced apart by a known distance. The housing 10 includes an insulating body 20 provided with a longitudinal passage 22 that extends lengthwise through the body 20. The passage 22 is defined in part by an upper surface 24 and a lower surface 26. The upper and lower surfaces 24 and 26 are parallel and face each other. Typically, the passage 22 is rectangular in cross-section.

Figure 3:
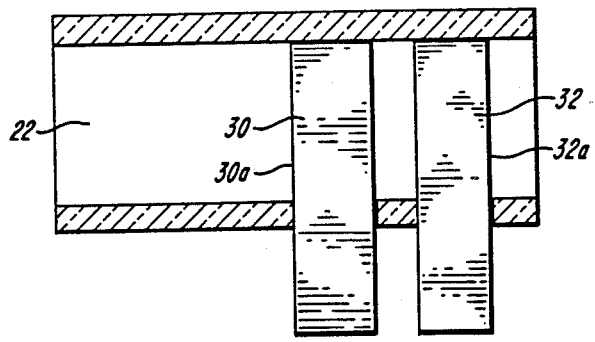
FIG. 3 is a cross-section taken along the line 3—3 of FIG. 1 showing the excitation electrodes.
Figure 4:
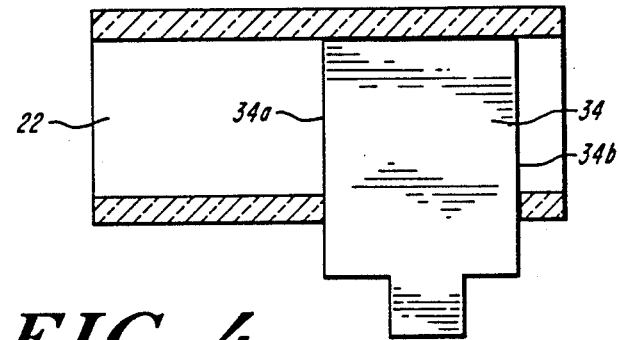
FIG. 4 is a cross-section taken along the line 4—4 of FIG. 1 showing the signal electrode.

Located on upper surface 24 are a first excitation electrode 30 and a second excitation electrode 32. Located on lower surface 26 is a third electrode 34 that functions as an output signal electrode. As best seen in FIG. 3, electrodes 30 and 32 preferably comprise generally flat, rectangular conductors oriented with their long dimensions perpendicular to passage 22. Third electrode 34 also comprises a flat, rectangular conductor. The third electrode 34 is sufficiently large to act as a capacitor plate for the first and second electrodes 30 and 32. Thus, a first capacitor is formed by electrodes 30 and 34, and a second capacitor is formed by electrodes 32 and 34. The upper surface 24 can be provided with a recess 36 for mounting of electrodes 30 and 32. Similarly, lower surface 26 can be provided with a recess 38 for mounting of electrode 34. The recesses 36, 38 eliminate the possibility of contact between the ground plane 16 and the electrodes 30, 32, 34 during operation.

The ground plane 16, which can be a solid conductor or an insulator having a metallized surface as described hereinafter, includes a base portion 40 for attachment to the test specimen 12, an arm 42 sized to extend into and through passage 22 and an interconnecting portion 44 that rigidly interconnects arm 42 and base portion 40. The arm 42 preferably has an elongated, rectangular shape and includes an aperture 46 for passage of electric fields. The aperture 46 is aligned with electrodes 30, 32 and 34 in a quiescent position and causes a variation in the capacitance of the strain gage as described hereinafter upon relative movement between the ground plane 16 and the housing 10.

As noted above, electrodes 30 and 32 are preferably parallel, rectangular strips. In a preferred embodiment, electrodes 30 and 32 have equal dimensions. Electrode 30 includes an outer edge 30a, and electrode 32 includes an outer edge 32a. As shown in FIG. 3, edges 30a and 32a are parallel to each other and are perpendicular to the direction of ground plane 16 movement in passage 22. Similarly, electrode 34 includes edges 34a and 34b, which are parallel to each other and perpendicular to the direction of ground plane 16 movement in passage 22. It is preferred that the electrodes 30, 32 and 34 be dimensioned such that edge 30a is parallel to and aligned with edge 34a and such that edge 32a is parallel to and aligned with edge 34b. Similarly, with reference to FIG. 1, aperture 46 in ground plane 16 includes an edge 46a and an edge 46b, which are parallel to each other and perpendicular to the direction of ground plane 16 movement in passage 22. Preferably, edge 46a is parallel to and aligned with edges 30a and 34a, and edge 46b is parallel to and aligned with edges 32a and 34b. While this construction is not required in accordance with the present invention, it provides highly linear operation.

As noted above, the body 20 of housing 10 is fabricated of insulating material. Preferably, the body 20 is fabricated of a ceramic material, such as sapphire or alumina, for stability under a wide range of environmental temperatures. The ground plane 16 can be a metallic conductor or can be a metallized ceramic, as described hereinafter. When the ground plane and the housing are fabricated from the same ceramic material, errors resulting from temperature variations are reduced.

As shown in FIG. 1, the insulating body 20 of housing 10 is attached at its underside to a thin mounting strip 50 which can be ceramic or metal. When the ground plane is fabricated of a ceramic material, a thin mounting strip 52 is attached to the underside of base portion 40. The attachment between mounting strip 50 and ceramic body 20 is formed by a conventional metal-to-ceramic bond or ceramic-to-ceramic bond. The mounting strips 50 and 52 are attached to the test specimen 12 by spot welding or adhesive bonding.

Operation of the capacitive strain gage in accordance with the present invention will now be described. A first capacitor is formed between electrode 30 and electrode 34, and a second capacitor is formed between electrode 32 and electrode 34. When the electrodes 30 and 32 have equal areas, the two capacitors have equal values. In a quiescent position with no strain in the test specimen 12, aperture 46 is exactly aligned with third electrode 34, and the ground plane 16 has no effect on capacitive coupling between the electrodes. In a typical half-bridge mode of operation, sine wave voltages of equal amplitude and 180° out-of-phase are applied to electrodes 30 and 32, respectively. When the two capacitors are exactly equal, the signal induced on electrode 34 is zero, since the out-of-phase signals cancel each other.

Figure 5:
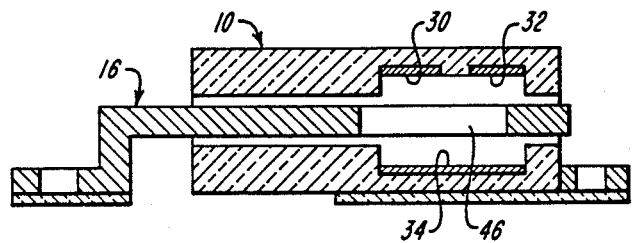
FIG. 5 is a cross-section of the strain gage illustrating relative displacement in one direction.

Reference is now made to FIG. 5 in which ground plane 16 is displaced to the left relative to housing 10. The relative displacement causes aperture 46 to be displaced relative to electrodes 30, 32 and 34. As a result, electrode 32 is partially shaded by ground plane 16, thereby causing a reduction in capacitive coupling between electrodes 32 and 34. The capacitor formed by electrodes 30 and 34 is not changed in this example, since electrode 30 is not shaded by ground plane 16. As a result, the signal coupled between electrodes 32 and 34 is less than the signal coupled between electrodes 30 and 34, and an unbalanced condition occurs. The resulting signal appearing on electrode 34 is a measure of the displacement.

Figure 6:
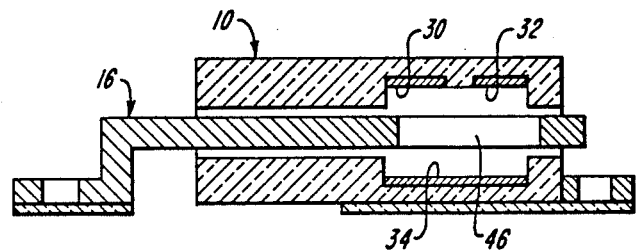
FIG. 6 is a cross-section of the strain gage illustrating relative displacement in the opposite direction.

Displacement of the ground plane 16 to the right relative to housing 10 is illustrated in FIG. 6. In this case, electrode 30 is partially shaded by ground plane 16 and the capacitor formed by electrodes 30 and 34 is reduced in capacitance. The capacitor formed by electrodes 32 and 34 is not altered by movement to the right. As a result, the signals coupled through the two capacitors are again unbalanced. In this case, however, the signal representing displacement is of the opposite phase relative to the input signal, as compared with displacement to the left. Therefore, the strain gage provides a measure not only of displacement, but also of the direction of the displacement. Details regarding a preferred signal conditioner for the capacitive strain gage are provided in application Ser. No. 07/238,541, filed concurrently herewith and entitled "Signal Conditioner For Capacitive Transducer."

Figure 7:
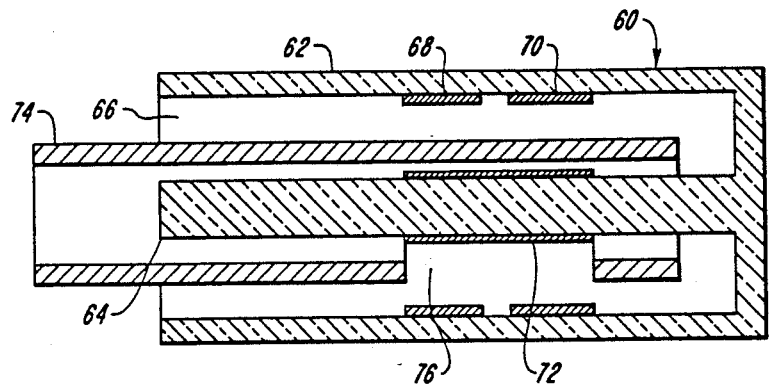
FIG. 7 is a cross-section of an annular capacitive strain gage in accordance with another embodiment of the present invention.

The capacitive strain gage shown and described hereinabove has a generally planar construction. The principles of the present invention utilizing capacitor electrodes that are in fixed relative positions and a ground plane that is movable relative to the electrodes can be utilized in an annular construction as shown in FIG. 7. A housing 60 includes a cylindrical shell 62 and a coaxial central shaft 64, which define an annular passage 66. A first annular electrode 68 and a second annular electrode 70 are located on the inner surface of shell 62. A third annular electrode 72 is located on the outer surface of shaft 64 in alignment with electrodes 68 and 70. A cylindrical ground plane 74 is sized to extend into passage 66. Ground plane 74 includes one or more apertures 76, aligned with electrodes 68, 70 and 72 in a quiescent position. The electrodes 68, 70 and 72 are in fixed relative positions on housing 60. During operation, ground plane 74 moves relative to housing 60 and causes aperture 76 to shade a part of electrode 68 or electrode 70, thereby causing the strain gage to be unbalanced as described above.

Figure 8:
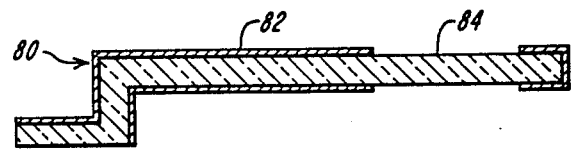
FIG. 8 is a cross-section of an alternate ground plane construction.

An alternate embodiment of the ground plane used in the strain gage illustrated in FIGS. 1-4 is shown in FIG. 8. In this embodiment, a ground plane 80 is fabricated of a ceramic insulating material having the same general shape as the ground plane 16, shown in FIG. 1, except that the aperture 46 is eliminated. The surface of the ground plane is metallized by evaporation or a similar process to form a metal layer 82. The metal layer 82 is not applied to a region 84 that corresponds to the aperture 46 in ground plane 16. The unmetallized region acts as an aperture for electric fields to pass between the electrodes of the strain gage. The ground plane 80 functions in the same manner as ground plane 16. Preferably, the ground plane 80 and the housing are made of the same ceramic insulating material, and therefore have the same thermal properties.

Figure 9:
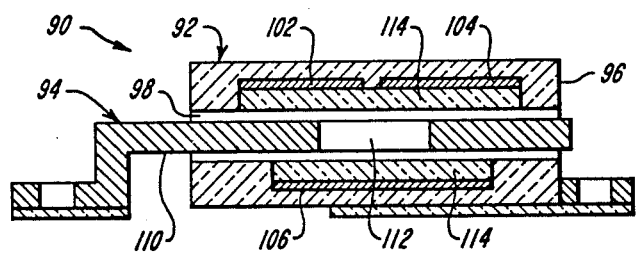
FIG. 9 is a cross-section of a capacitive strain gage in accordance with another embodiment of the present invention.

Still another embodiment of a capacitive strain gage in accordance with the present invention is illustrated in FIG. 9. A capacitive strain gage 90 includes a housing 92 and a ground plane 94. The housing 92 includes an insulating body 96 having a passage 98 extending therethrough. Excitation electrodes 102 and 104 are positioned on an upper surface of passage 98, and a signal electrode 106 is positioned on a lower surface of passage 98. Ground plane 94 includes an arm 110 extending into passage 98 and having an aperture 112 for passage of electric fields between electrodes 102 and 106 and between electrodes 104 and 106. A recess between electrodes 102, 104 and passage 98 is typically, but not necessarily, filled with a high dielectric material 114. A recess between electrode 106 and passage 98 is likewise typically, but not necessarily, filled with a high dielectric material 114. Air can also be used as the dielectric material.

Capacitive strain gage 90 differs from the embodiment illustrated in FIGS. 1-4 in that excitation electrodes 102 and 104 have outer edges which extend beyond the edges of signal electrode 106. Also, aperture 112 is smaller in area than any of the electrodes. The capacitive strain gage 90 operates in generally the same manner as the strain gage illustrated in FIGS. 1-4, except that when ground plane 94 is displaced relative to housing 92, the capacitance of one capacitor (for example, the capacitor formed by electrodes 102 and 106) increases, and the capacitance of the other capacitor (for example, the capacitor formed by electrodes 104 and 106) decreases. Furthermore, since the aperture 112 is smaller than the electrodes 102, 104 and 106, the shape and area of the electrode edges are not important to operation of the strain gage. The area of aperture 112 determines the capacitive coupling between the electrodes. Thus, the edges of electrodes 102, 104 and 106 are not necessarily parallel and are not necessarily aligned with each other in this embodiment.

The high dielectric material 114 increases the capacitance between electrodes 102 and 106 and between electrodes 104 and 106, so that a larger output signal is obtained. This feature is important in situations where low values of strain are being measured.

While there has been shown and described what is at present considered the preferred embodiments of the present invention, it will be obvious to those skilled in the art that various changes and modifications may be made therein without departing from the scope of the invention as defined by the appended claims.

What is claimed is:

1. A capacitive strain gage for measuring strain in a test specimen, comprising:

a housing attachable to the test specimen at a first location, said housing including a passage extending therethrough between spaced-apart opposing surfaces, one of said opposing surfaces having first and second electrodes disposed thereon and the other of said opposing surfaces having a third electrode disposed thereon, said electrodes each having fixed positions on said housing, and said first and second electrodes each being positioned for capacitive coupling to said third electrode; and a ground plane attachable to the test specimen at a second location in movable relation to said housing, said ground plane including an arm that extends into the passage in said housing, said arm including an aperture for electric fields that is aligned with said electrodes in a quiescent position, said aperture being sized and shaped such that when strain in said test specimen causes relative movement of said housing and said arm, the capacitive coupling between said third electrode and at least one of said first and second electrodes is changed, wherein said first and second electrodes comprise parallel conductive strips perpendicular to the direction of relative movement of said housing and said ground plane, wherein said first and second electrodes have parallel outer edges perpendicular to the direction of relative movement and wherein the aperture in said ground plane includes parallel opposite edges that are respectively aligned with and parallel to the outer edges of said first and second electrodes.

2. A capacitive strain gage as defined in claim 1 wherein said first and second electrodes are in a first plane and said third electrode is in a second plane parallel to said first plane.

3. A capacitive strain gage as defined in claim 2 wherein said third electrode includes parallel opposite edges that are respectively aligned with and parallel to the outer edges of said first and second electrodes.

4. A capacitive strain gage as defined in claim 1 wherein said first and second electrodes have outer edges that extend beyond the aperture in said ground plane.

5. A capacitive strain gage as defined in claim 1 wherein said third electrode has outer edges that extend beyond the aperture in said ground plane.

6. A capacitive strain gage as defined in claim 1 wherein said electrodes are located in recesses in said opposing surfaces to prevent contact between said ground plane and said electrodes.

7. A capacitive strain gage as defined in claim 6 wherein said recesses are filled with a high dielectric material.

8. A capacitive strain gage as defined in claim 1 wherein said first and second electrodes, said aperture and said third electrode have an annular configuration.

9. A capacitive strain gage for measuring strain in a test specimen, comprising:

a housing attachable to the test specimen at a first location, said housing including a passage extending therethrough between spaced-apart opposing surfaces, one of said opposing surfaces having first and second electrodes disposed thereon and the other of said opposing surfaces having a third electrode disposed thereon, said electrodes each having fixed positions on said housing, and said first and second electrodes each being positioned for capacitive coupling to said third electrode; and a ground plane attachable to the test specimen at a second location in movable relation to said housing, said ground plane including an arm that extends into the passage in said housing, said arm including an aperture for electric fields that is aligned with said electrodes in a quiescent position, said aperture being sized and shaped such that when strain in said test specimen causes relative movement of said housing and said arm, the capacitive coupling between said third electrode and at least one of said first and second electrodes is changed, wherein said ground plane comprises an insulating material and wherein said arm has a metallized surface layer, said aperture for electric fields being defined by an opening in said metallized surface layer.

* * * * *

UNITED STATES PATENT AND TRADEMARK OFFICE
CERTIFICATE OF CORRECTION

PATENT NO. : 4,944,181

DATED : July 31, 1990

INVENTOR(S) : Vincent P. Wnuk

It is certified that error appears in the above-identified patent and that said Letters Patent is hereby corrected as shown below:

Column 1, line 4, after the title insert
        --GOVERNMENT RIGHTS
          This invention was made with Government support
        under contract NASI-18411 awarded by NASA. The
        Government has certain rights in this invention--.

Signed and Sealed this

Sixteenth Day of June, 1992

Attest:

DOUGLAS B. COMER

*Attesting Officer*      *Acting Commissioner of Patents and Trademarks*